(12) United States Patent
Dryer et al.

(10) Patent No.: US 12,125,062 B2
(45) Date of Patent: Oct. 22, 2024

(54) AUTOMATED DEBUNDLING AND CATEGORIZATION OF PURCHASES

(71) Applicant: Bank of America Corporation, Charlotte, NC (US)

(72) Inventors: Eric Dryer, Charlotte, NC (US); Pratap Dande, St. Johns, FL (US); Kevin A. Delson, Woodland Hills, CA (US); Gilbert Gatchalian, Union, NJ (US); Lalit Dhawan, Cranbury, NJ (US); Linda Haddad, Concord, CA (US); Morgan Allen, Waxhaw, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/073,655

(22) Filed: Dec. 2, 2022

(65) Prior Publication Data
US 2024/0185295 A1 Jun. 6, 2024

(51) Int. Cl.
*G06Q 30/02* (2023.01)
*G06Q 30/0251* (2023.01)

(52) U.S. Cl.
CPC ..... *G06Q 30/0255* (2013.01); *G06Q 30/0257* (2013.01)

(58) Field of Classification Search
CPC ............ G06Q 30/0255; G06Q 30/0257
See application file for complete search history.

(56) References Cited

U.S. PATENT DOCUMENTS

| | | | |
|---|---|---|---|
| 8,572,072 B1 * | 10/2013 | Roumeliotis | G06F 16/353 707/722 |
| 9,818,153 B1 * | 11/2017 | Nickel | G06Q 40/00 |
| 9,934,494 B1 * | 4/2018 | Nolte | G06Q 20/14 |
| 10,564,990 B1 * | 2/2020 | Kapulkin | G06F 9/453 |
| 10,825,074 B1 * | 11/2020 | Edwards | G06Q 20/4014 |
| 2011/0208588 A1 * | 8/2011 | Joa | G06Q 30/0258 705/30 |

(Continued)

OTHER PUBLICATIONS

"Gathering product and pricing data by scanning supermarket receipts with OCR & Machine learning" (published on Nov. 26, 2020 at https://www.klippa.com/en/blog/information/gathering-product-and-pricing-data-by-scanning-supermarket-receipts-with-ocr-machine-learning/) (Year: 2020).*

Primary Examiner — James M Detweiler
(74) Attorney, Agent, or Firm — Weiss & Arons LLP

(57) ABSTRACT

A bot automatically compiles transaction information for a consumer from merchants that sell products in various categories and merchants that sell products in only a single category. The bot categorizes the consumer's purchases from the merchants and determines percentages of consumer spending in each category. The bot may obtain a category for purchases from merchants selling a single category of items based on a merchant identifier such as a merchant code. For other merchants, the bot may obtain category information from the merchant or from an analysis of a category code, or a product or service description or identifier. The categories and percentages of the consumer's purchases may be provided by the bot to the consumer or to a third party. The bot may provide special offers and promotions to a consumer based on the compiled category information and percentage spending by the consumer by category.

4 Claims, 11 Drawing Sheets

(56) References Cited

U.S. PATENT DOCUMENTS

| | | | |
|---|---|---|---|
| 2014/0006198 A1* | 1/2014 | Daly | G06Q 30/06 |
| | | | 705/26.1 |
| 2014/0244462 A1* | 8/2014 | Maenpaa | G06Q 30/04 |
| | | | 705/35 |
| 2015/0032616 A1* | 1/2015 | Blackhurst | G06Q 40/02 |
| | | | 705/42 |
| 2016/0321705 A1* | 11/2016 | Scheidelman | G06F 40/20 |
| 2018/0247354 A1* | 8/2018 | Pratt | H04L 47/10 |
| 2020/0126151 A1* | 4/2020 | Botella | G06Q 20/0855 |
| 2022/0327636 A1* | 10/2022 | Rhoss | G06Q 40/10 |
| 2023/0005012 A1* | 1/2023 | Benkreira | G06Q 20/201 |

* cited by examiner

200

CATEGORIES (EXAMPLES)

BEDDING
BOOKS
CLOTHING
DINING
FOOD
FURNITURE
HOUSEWARES
INSURANCE
OFFICE SUPPLIES
OTHER
TRANSPORTATION

FIG. 2

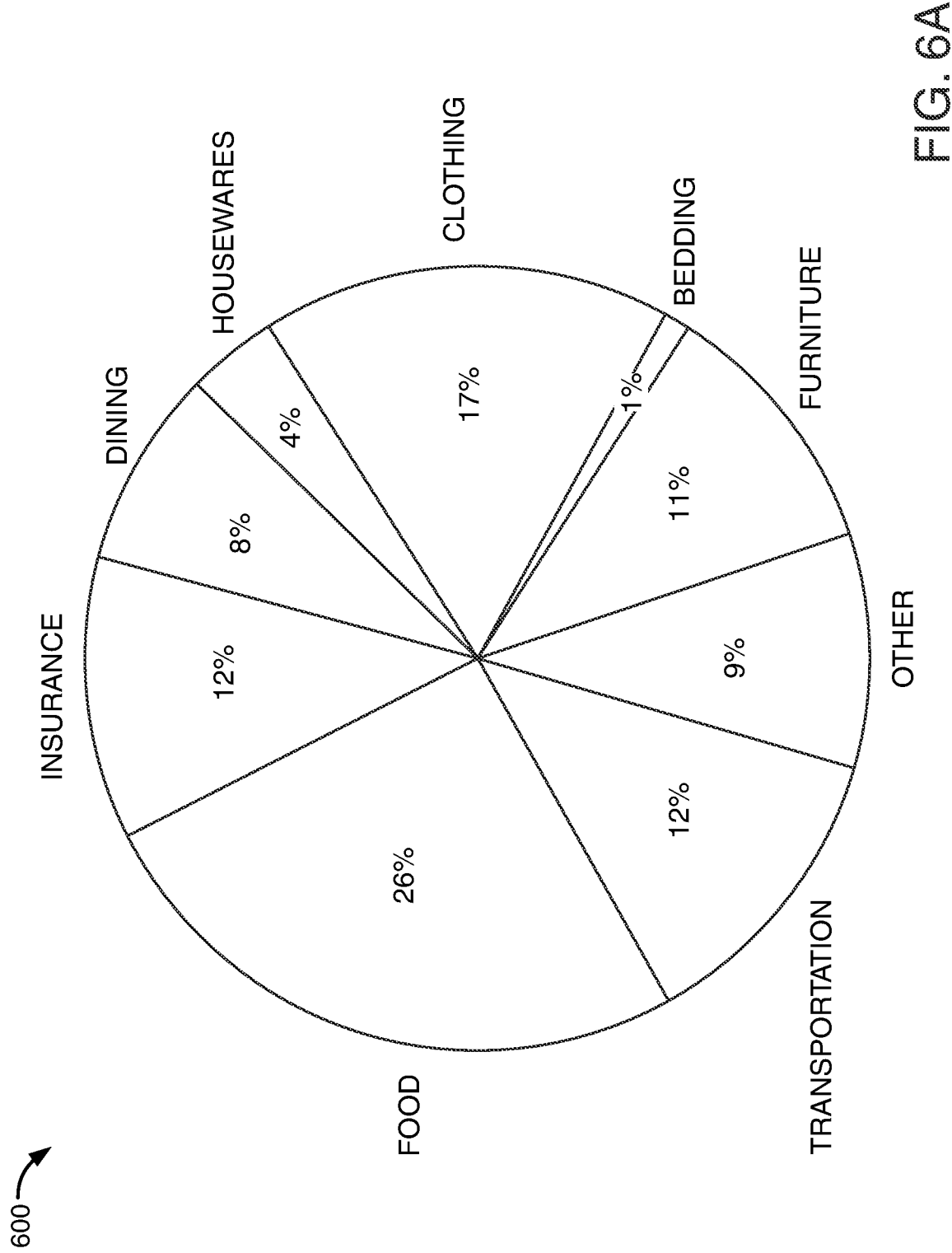

AUTOMATED DEBUNDLING AND CATEGORIZATION OF PURCHASES

FIELD OF THE DISCLOSURE

Aspects of the disclosure relate to automatically categorizing consumer purchase information across multiple merchants.

BACKGROUND OF THE DISCLOSURE

A consumer may find it beneficial to analyze the consumer's spending habits and possibly modify spending accordingly. One way to achieve this is by monitoring how much the consumer is spending and trying to determine how much is being spent for different categories of items. These categories may include, for example, clothing, housing, food, housewares, medical, transportation, insurance, etc. A consumer may review the categories of spending and consider whether their spending in a particular category or categories is too high or too low and may choose to reallocate future spending.

Consumers may determine some of this information from reviewing banking or credit card statements and receipts. Financial institutions and other entities may assist their customers by providing them with some categorization of purchases, such as on the customers' banking or credit card statements, to the extent that these companies can readily determine the information. Such categorizations may be based on the merchant information from which the purchase was made. When a merchant from which a consumer purchases an item sells just one category of merchandise, e.g., a furniture store, the categorization of the purchase may be straightforward. However, categorization of purchases from merchants, such as a department store or a marketplace that sells multiple categories of items, may be difficult as transaction information provided on receipts do not generally specify a category description for the items purchased. For example, a department store, like Walmart or Target, a wholesale club, or an online marketplace like Amazon, sells a diverse selection of items. The department store, wholesale club, or online marketplace may provide transaction information such as an item name, quantity, and price to the consumer, but this information may not be provided to the credit card issuer. The transactions on receipts from these marketplaces may thus be considered as "bundled" and may be grouped under an "Other" category. An "Other" category may not be particularly useful to help a consumer understand the consumer's spending habits. A consumer may therefore only be able to account for some spending by category but may find it difficult to track other purchases by category.

SUMMARY OF THE DISCLOSURE

It is an object of this invention to provide a more detailed and automated categorization of purchases by a consumer across merchants in a more comprehensive way.

A method of using a bot to automatically categorize purchases by a consumer may be provided. The bot may be activated periodically, such as upon request by the consumer or by a third party authorized by the consumer. This method may be performed by a bot computer program product that includes executable instructions that may be executed by a processor on a computer system.

The method may include capturing, by the bot, electronic data that includes transaction information for the purchases by the consumer of a group of products or services from a first merchant. The transaction information may or may not include a category description for the respective product or service. The transaction information may include, for a respective product or service, at least one of a category code, a product or service description, or a product or service identifier associated by the first merchant with the respective product or service, and a cost of the respective product or service to the consumer. The respective products or services in the group that were purchased from the first merchant may be separately categorized, by the bot, in one of different categories. The categorization of the one or more of the products or services may be based on the at least one of the category code, the product or service description, or the product or service identifier associated with the respective product or service.

The method may further include categorizing, by the bot using second transaction information for one or more additional purchases by the consumer from a second merchant, and combining, by the bot, the categorizations of each of the one or more of the products or services in the group that were purchased from the first merchant with the categorization of the one or more additional purchases from the second merchant. For each of the different categories into which the one or more of the products or services from the first and second merchants may be categorized, the bot may determine a percentage of the cost of the purchases in the respective category out of a total cost of the purchases made by the consumer from the first and second merchants on a specific date or within a date range. The bot may provide, by category, the combined categorizations for products or services purchased by the consumer from the first and second merchants and the percentages of the purchases in the respective category to a consumer or to a third party.

In embodiments, the second merchant may sell a second group of products or services in only a single category, and the one or more additional purchases from the second merchant may be categorized based on the identity of the second merchant or a merchant category associated with the second merchant.

The categorization of a respective product or service may include categorizing, by the bot, the respective product or service based on the description of the respective product or service provided by the first merchant, including terms or abbreviations used in the description. The categorization may include comparing, by the bot, the description of the respective product or service to a predefined list of categories. Each respective category of the predefined list of categories may be associated with one or more terms or abbreviations that are used in connection with the respective category.

The electronic data that includes the transaction information may be obtained in various ways. As some examples, the transaction information may be obtained from a billing statement for the consumer, by accessing an online account of the consumer with the first merchant or the second merchant, from an inbox or database in which payment confirmations associated with at least one of the first and second merchants are maintained, from an online payment service used by the consumer, or from consumer-provided transaction information.

In embodiments, the transaction information may be received by the bot at a router that hosts the bot.

The method may include requesting, by the bot, authorization from the consumer to obtain the transaction information for the purchases directly from the first and second merchants. The method may include offering a promotion to the consumer in exchange for the consumer granting the requested authorization.

The method may include offering a promotion to the consumer based on purchase activity of the consumer reflected in the combined categorizations and the percentages. Buying patterns may be detected based on the purchase activity of the consumer. The promotion may be based on the detected buying patterns.

A method of using a bot to automatically categorize purchases by a consumer and one or more items in a shopping cart of a consumer but not purchased by the consumer may also be provided. The bot may be activated periodically, such as upon request by the consumer or by a third party authorized by the consumer. This method may be performed by a bot computer program product that includes executable instructions that may be executed by a processor on a computer system.

The method may include capturing, by the bot, first electronic data that includes transaction information for the purchases by the consumer of a group of products or services from a first merchant. The transaction information may include, for one or more of the products or services that were purchased from the first merchant, at least one of a category code, a product or service description, or a product or service identifier associated by the first merchant with the respective product or service, and a cost of the respective product or service to the consumer. The transaction information may or may not include a category description for the respective product or service.

The method may further include separately categorizing, by the bot, each of the products or services in the group that were purchased from the first merchant in one of different categories based on the at least one of the category code, the product or service description, or the product or service identifier associated with the respective product or service.

One or more items in the shopping cart may also be separately categorized by the bot based on second electronic data captured for the one or more items in the shopping cart. The one or more items may include one or more additional products or services sold by the first merchant or by a second merchant. The categorizations of each of the one or more of the products or services in the group that were purchased from the first merchant may be combined, by the bot, with the categorization of the one or more items in the shopping cart. For each of the different categories into which the products or services and the one or more items in the shopping cart may be grouped, the bot may determine a relative percentage of a total cost of the purchases made by the consumer on a specific date or within a date range and the one or more items in the shopping cart that are categorized in the respective category.

The bot may provide the categories into which the purchases made by the consumer and the one or more items in the shopping cart have been categorized, and, for each of the categories, a percentage of the total cost of the purchases and the cost of the one or more items in the shopping cart in the respective category.

The categorization of a respective product, service, or item in the shopping cart may include categorizing the respective product or service, based on the description of the respective product, service, or item, and comparing, by the bot, the description to a list of terms or abbreviations that may be used in connection with the respective category.

The categorization of the purchases and the one or more items in the shopping cart may be combined, by the bot, with additional purchase data reflecting one or more additional purchases by the consumer from a third merchant that sells products or services in only a single category. The one or more additional purchases made by the consumer may be categorized, by the bot, based on the identity of the third merchant or a merchant category associated with the third merchant.

The bot may recalculate the relative percentages of the purchases and the one or more items in the shopping cart, by category, out of the total cost of the purchases made by the consumer and the one or more items in the shopping cart on a specific date or within a date range when an additional item is added to the shopping cart or when at least one of the one or more items in the shopping cart is removed from the shopping cart. The bot may provide the categorization and percentages of the purchases to the consumer or to a third party.

Also disclosed is a non-transitory computer-readable memory storing computer-executable instructions that, when executed by a processor on a computer, cause the computer to use a bot to automatically categorize purchases by a consumer. The automatic categorization may include capturing, by the bot, electronic data that includes transaction information for the purchases by the consumer of a group of products or services from a first merchant. Each of the products or services may be categorizable in one of different categories. The transaction information a may include, for one or more of the products or services that were purchased from the first merchant, at least one of a category code, a product or service description, or a product or service identifier associated by the first merchant with a respective product or service, and a cost of the respective product or service. The transaction information may or may not include a category description for the respective product or service.

The bot may separately categorize the products or services in the group that were purchased from the first merchant in one of different categories. The categorization of the one or more of the products or services may be based on the at least one of the category code, the product or service description, or the product or service identifier associated with the respective product or service. The bot may also categorize one or more additional purchases by the consumer from a second merchant and combine the categorizations of each of the one or more of the products or services in the group that were purchased from the first merchant with the categorization of the one or more additional purchases from the second merchant.

The bot may then determine, for each of the plurality of different categories into which the one or more of the products or services from the first and second merchants may be categorized, a percentage of the cost of the purchases in the respective category out of a total cost of the purchases made by the consumer from the first and second merchants on a specific date or within a date range, and provide, by category, the categorizations for products or services purchased by the consumer from the first and second merchants and the percentages of the purchases in the respective category to the consumer or a third party.

Also disclosed is a non-transitory computer-readable memory storing computer-executable instructions that, when executed by a processor on a computer, cause the computer to use a bot to automatically categorize purchases by a consumer and one or more items added to a shopping cart but not purchased by the consumer. The bot may capture electronic data that includes transaction information for the purchases by the consumer of a group of products or services from a first merchant. The transaction information may include, for one or more of the products or services that were purchased from the first merchant, at least one of a category code, a product or service description, or a product or service identifier associated by the first merchant with the respective product or service, and a cost of the respective product or service. The transaction information may or may not include a category description for the respective product or service;

The bot may separately categorize the products or services in the group that were purchased from the first merchant in one of different categories. The categorization of the one or more of the products or services may be based on the at least one of the category code, the product or service description, or the product or service identifier associated with the respective product or service, and separately categorize the one or more items in the shopping cart based on electronic data captured for the one or more items in the shopping cart, wherein the one or more items include one or more additional products or services sold by the first merchant or by a second merchant. The bot may combine the categorizations of each of the one or more of the products or services in the group that were purchased from the first merchant with the categorization of the one or more items in the shopping cart, and determine, for each of the different categories into which the products or services and the one or more items in the shopping cart may be grouped, a relative percentage of a total cost of the purchases made by the consumer on a specific date or within a date range and the one or more items in the shopping cart that may be categorized in the respective category. The bot may provide the categories into which the purchases made by the consumer and the one or more items in the shopping cart have been categorized, and, for each of the categories, a percentage of the total cost of the purchases and the cost of the one or more items in the shopping cart in the respective category.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 2 shows illustrative categories into which the transactions may be categorized in accordance with principles of the disclosure.

FIG. 6A shows an illustrative pie chart that displays combined categorization information in accordance with principles of the disclosure.

DETAILED DESCRIPTION OF THE DISCLOSURE

The present disclosure relates to methods of, and systems and apparatus for using a bot to collect transaction information associated with a consumer from multiple merchants and to categorize for the consumer or an authorized third party the purchases by the consumer from these merchants and to determine percentages of total expenditures by the consumer by category. The disclosure is particularly applicable where at least one of the merchants sells products or services from multiple categories but does not provide a category description for each of the products or services that were sold to the consumer. Therefore, a different approach is required to categorize those products or services with no provided category description.

Illustrative embodiments of methods, systems, and apparatus in accordance with the principles of the invention will now be described with reference to the accompanying drawings, which form a part hereof. It is to be understood that other embodiments may be utilized, and structural, functional, and procedural modifications may be made without departing from the scope and spirit of the present invention.

The drawings show illustrative features of methods, systems, and apparatus in accordance with the principles of the invention. The features are illustrated in the context of selected embodiments. It will be understood that features shown in connection with one of the embodiments may be practiced in accordance with the principles of the invention along with features shown in connection with another of the embodiments.

Methods, systems, and apparatus described herein are illustrative. Methods, systems, and apparatus of the invention may involve some or all of the steps of the illustrative methods and/or some or all of the features of the illustrative system or apparatus. The steps of the methods may be performed in an order other than the order shown or described herein. Some embodiments may omit steps shown or described in connection with the illustrative methods. Some embodiments may include steps that are not shown or described in connection with the illustrative methods, but rather are shown or described in a different portion of the specification.

Figure 1:
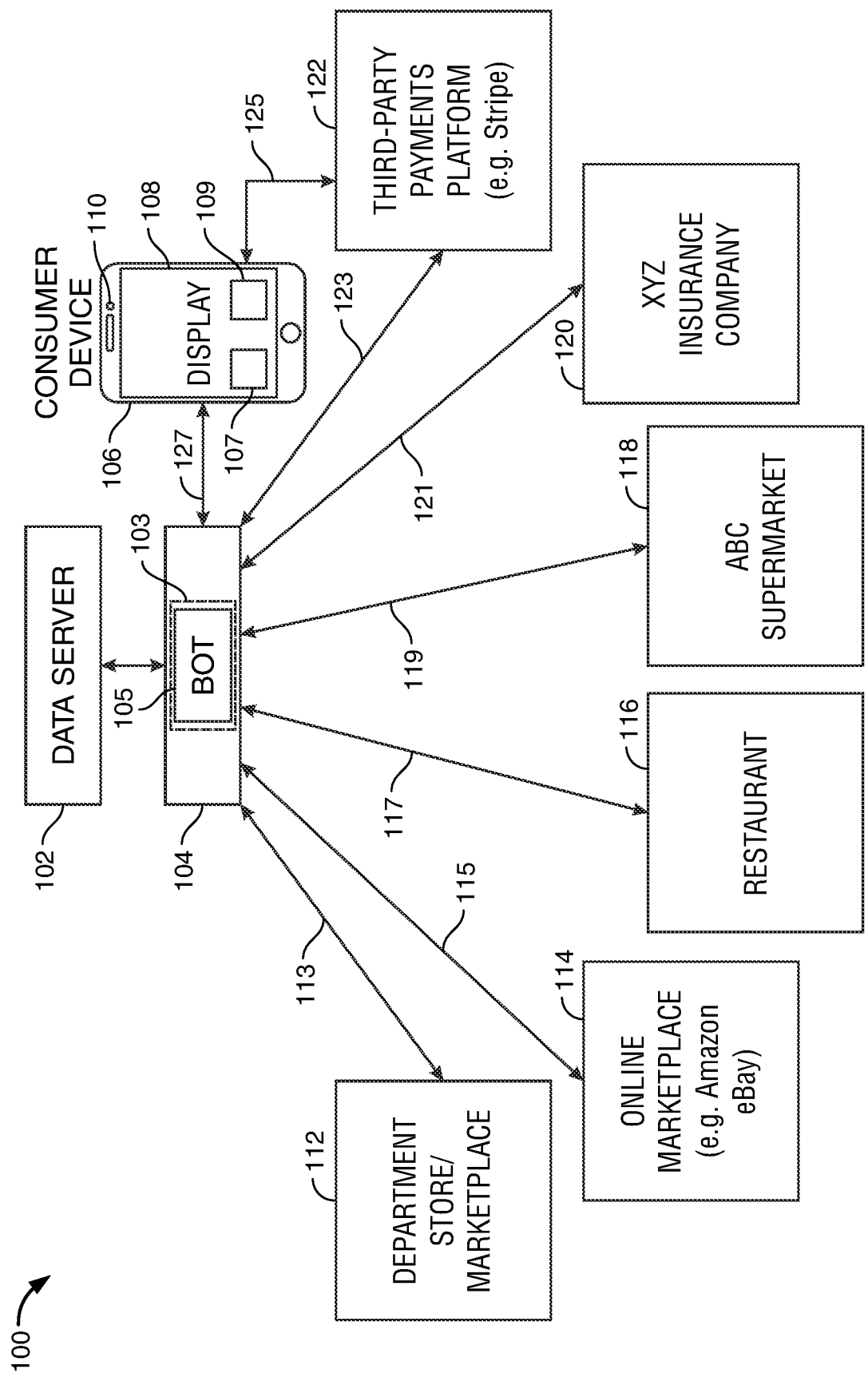
FIG. 1 shows an illustrative environment in which a bot that categorizes transactions from multiple sources may operate in accordance with principles of the disclosure.

FIG. 1 shows an illustrative environment 100 in which the principles of the invention may be practiced. A consumer may purchase products or services from various merchants. Some merchants may sell multiple categories of products or services that may be categorized differently from one another. For example, a department store 112 (one type of marketplace) may sell multiple categories of products. As another example, a marketplace 114 such as an online marketplace like Amazon or eBay, which may be considered a merchant for the purposes of this application, may offer many different products and services that may be sold thereon by different sellers. Other sellers may sell just one category of product or service. For example, a restaurant 116 may just sell food. An insurance company, XYZ Insurance 120, is another example of a merchant that just sells insurance. ABC Supermarket 118 is an example of a merchant that may just sell food, or it may also sell other products like houseware, clothing, or electronics. A merchant may sell the products or services in various ways, such as, for example, in a store, online, or by phone.

A consumer or a third party may wish to have categorized transaction information for the consumer's purchases from merchants, including those merchants that sell items in multiple categories, such that each item in a consumer's purchase may be associated with a particular category. The categorization of the purchases across merchants patronized by the consumer, such as on a specific date or within a specified date range, may be combined, and percentages of the overall costs of the purchases to the consumer for each of the categories across multiple merchants may be determined. The categorized transaction information may also reflect product returns and canceled services.

This combined categorization information and percentages of consumer spending in each category may be useful to a consumer, for example, to review and analyze the types of expenditures being made by the consumer. The information may also be useful to a third party, for example, to be able to determine consumer preferences for a particular category or categories of products or services for research and marketing purposes such as provide promotions or special offers to the consumer. A third party may need to obtain authorization from the consumer to be permitted to collect and use the information.

A consumer may pay for products or services in various ways such as with cash, or by credit or debit card, or using a payment service such as third-party payment platform (e.g., Stripe) 122. Most of these transactions will generate an electronic record, such as an electronic record, e.g., an electronic receipt or a posting to an account, or a paper receipt. Depending on the method of payment by the consumer, transactions may be electronically posted to a website and may appear on a billing statement, such as a monthly billing statement, from a credit card issuer.

A bot 105 may be provided to capture the transaction information (e.g., as electronic data), categorize the consumer purchases across multiple merchants, and determine, to the extent possible, percentages of consumer spending by category. Bot 105 may be operated by an entity 104. Entity 104 may be, for example, a credit or debit card issuer used by the consumer, the consumer itself, or a third party other than a credit or debit card issuer or the consumer that is authorized by the consumer 104 to collect the transaction information for purchases across merchants. Bot 105 may be hosted, for example, on a computing device 103 or a router of entity 104, at a data center 102, or on a consumer device such as consumer device 106 shown in FIG. 1. Consumer device 106 may be, for example, one of a smartphone, a laptop, tablet, iPad, a smart car, a smart card, or any other computing device and may have a display 108.

Data relating to the purchases from the merchants and the categorization information may be stored at data center 102, computing device 103, consumer device 106, or elsewhere and bot 105 may be programmed to communicate with data center 102 or devices 103 or 106. Bot 105 may also communicate with the merchants from which the consumer has purchased products or services. For example, bot 105 may communicate with merchants, such as department store 112, online marketplace 114, restaurant 116, ABC Supermarket 118, XYZ Insurance Company, and third party payment platform 112 over respective links 113, 115, 117, 119, 121, and 123. Bot 105 may also communicate with consumer device 106 over link 127. Consumer device 106 may communicate with third-party payments platform 122 over link 125.

Each merchant may be uniquely identified, such as by a merchant name and location or by an electronic code. One example of an electronic code is a Merchant Category Code (MCC), which is a number (currently four digits) that indicates a line of business of the merchant and types of products or services provided. The merchant code may not appear on a customer receipt from a merchant but may be electronically provided or obtained for purchases, such as purchases made using a credit or debit card.

Some of the consumer's purchases from merchants that each sell products or services in only one category may be categorized based on merchant information such as the MCC or on category descriptions for the transactions as provided by the merchants on a transaction receipt.

Other merchants that sell products or services across multiple categories may provide a category description for some items, and this may be used to categorize those items. For example, a receipt for a purchase from a department store may specify a "Clothing" category next to the shirt. However, many, if not most, merchants do not specify a category description per item. This makes it difficult to automatically categorize those items in categories. So, without more, the items may end up being characterized in an "Other" category.

There is, however, other data that some these merchants may provide with the transaction data such as a category code (e.g., 191 for clothing, 395 for food, or 025 for cleaning products), a product or service description (e.g., skirt, chocolates, dish soap), or some other product or service identifier (e.g., a SKU (stock keeping unit) number, or an abbreviation of a product name (e.g., "sht" which may mean shirt)) that is associated with the respective product or service. The category code, product or service description, or the product or service identifier, or some other information provided by the merchant may be used by bot 105 to categorize items purchased by the consumer.

Bot 105 may obtain the transaction data directly from the merchants, a third party payment platform 122, a consumer or other sources. In embodiments, a consumer using a consumer device 106 may specifically indicate to bot 105 that the consumer had shopped at one or more merchants.

The categorizations by bot 105 may be performed periodically or in real-time. The categorizations may be performed upon request by the consumer or by an authorized third party.

FIG. 2 shows an illustrative list 200 of some categories into which the transactions by the consumer may be categorized. In embodiments, the categories to be used for categorization may be predefined, such as by entity 104, by the consumer, or by a third party.

In embodiments, the consumer may personalize the categories that are to be used to categorize the transactions for that consumer. A first consumer may prefer, for example, to have all of the transactions categorized in just a few categories of significance to the user (such as the categories shown in FIG. 2). A different consumer may wish to have the transactions categorized in more detailed categories. The first consumer may also wish to be able to categorize the transactions in multiple ways (e.g., by fewer categories and by more detailed categories). Additionally, the categories may be subcategorized in sub-categories of items. As an example, clothing may be categorized or subcategorized into shirts, outerwear, shoes, etc.

Figure 3A:
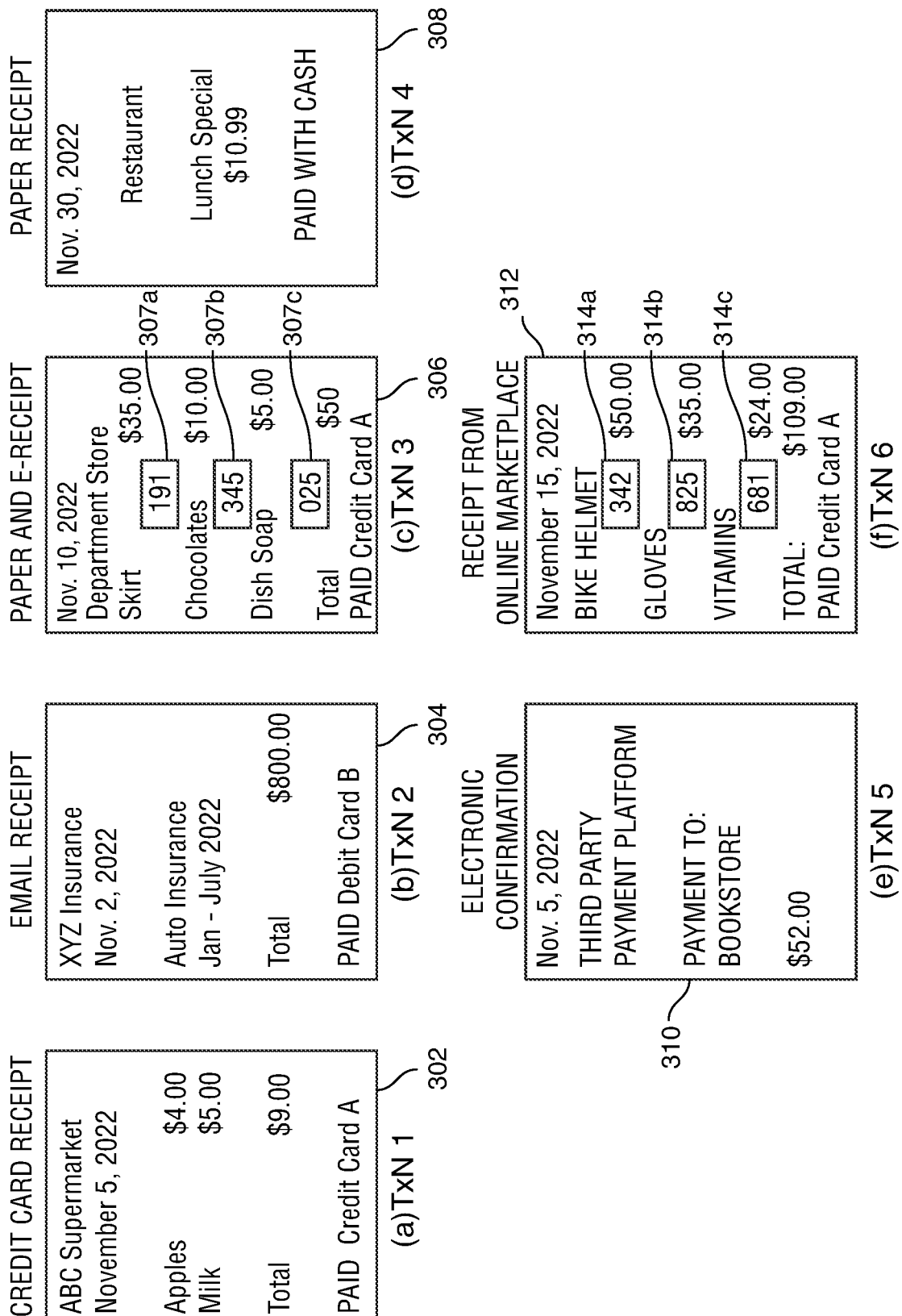
FIG. 3A shows illustrative examples of multiple sources of transaction information from which a combined categorization of the transactions may be generated in accordance with principles of the disclosure.

FIG. 3A shows illustrative examples of transaction information such as receipts reflecting transactions by the consumer with the merchants. The transaction information on the receipts may be used by bot 105 to categorize products or services. The receipts may be received in electronic form, such as by email or downloaded from a merchant website, or converted to an electronic form from paper receipts. The transaction information may include at least one of a category code, a product or service description or a product or service identifier that is associated by the merchant with the respective product or service. The transaction information may also indicate a cost of the respective product or service. The transaction information may or may not include a category description for a respective product or service in which a category is derived from other data.

The transaction information may be saved in a memory. The memory may be located on a device operated by entity 104, at data center 102, on consumer device 106, or on some other memory that is in communication with bot 105. One or more of receipts on consumer device 106 may have been initially sent to an inbox 107 of a consumer's email or to a database (e.g., on consumer device 106) and then downloaded to consumer device 106 or one or more receipts may have been captured as an image (e.g., with camera 110 on consumer device 106) or scanned and processed by optical character recognition (OCR) and saved to a memory.

FIG. 3A(a) shows an example of a receipt 302 for a transaction TxN1 for the consumer's food purchase from a supermarket for which the consumer paid with a credit card. In this example, the receipt may not include any categorization information for this transaction, but the merchant may be identified with a merchant-specific code communicated to the credit card issuer. As the supermarket may sell multiple types of products, bot 105 may analyze the product description (e.g., apples and milk) and may categorize the purchases as food (e.g., by comparing the product description to a look up table that is accessible to bot 105).

FIG. 3A(b) shows an example of a receipt 304 for a transaction TxN2 for auto insurance via the consumer's debit card. The category for this transaction may be discerned just from the merchant code, although categorization into a particular type of insurance (e.g., home, auto, medical, etc.) may be desirable and may be possible by reference to a product description.

FIG. 3A(c) shows an example of a receipt 306 for a transaction TxN3 for a department store purchase by the consumer where the consumer purchased in a single transaction a skirt, chocolates, and dish soap using a credit card. In this example, category codes 307a, 307b, 307c may be shown on receipt 306. The significance of the codes need not be identified to the consumer. The code definitions may be obtained by entity 104. Entity 104 may, for example, determine the meaning of the category codes by requesting codes from the merchant or based on definitions based on the items shown or based on previous usage of similar codes by this merchant. Code 191 may correspond to a category "Clothing", code 345 may correspond to a category "food", and code 025 may correspond to a category "cleaning products."

FIG. 3A(d) shows an example of a paper receipt 308 from a restaurant for a transaction TxN4. This receipt may not have been saved digitally initially. However, the consumer may capture an image of the receipt, use an optical character recognition (OCR) tool to read the information on the receipt, and have the receipt saved to a memory such as on consumer device 106. Bot 105 may access this receipt from a memory, such as a memory on consumer device 106 or at data center 102, for analysis in performing the categorization in accordance with aspects of the present disclosure.

FIG. 3A(e) shows an example of a record of a transaction TxN5 in which the consumer has paid an invoice using a third party payment platform 122 such as Stripe. For example, the consumer may have paid its landscaper using this platform. Third party payment platform 122 may generate an electronic confirmation record for this payment such as electronic confirmation 310.

FIG. 3A(f) shows an example of a receipt 312 for a transaction TxN6 for an online marketplace where the consumer purchased in one order a bike helmet, gloves, and vitamins. As with the department store purchase, these items may not include a category description. However, the items may have a code associated with each item. For example, a bike helmet may be categorized with category code 342, which may signify a category of biking or a more specific category of "bike helmets." Gloves may be categorized with a category 825 which may represent a category of "clothing". Vitamins may be categorized with a category 681 which may categorized as "medical".

Figure 4:
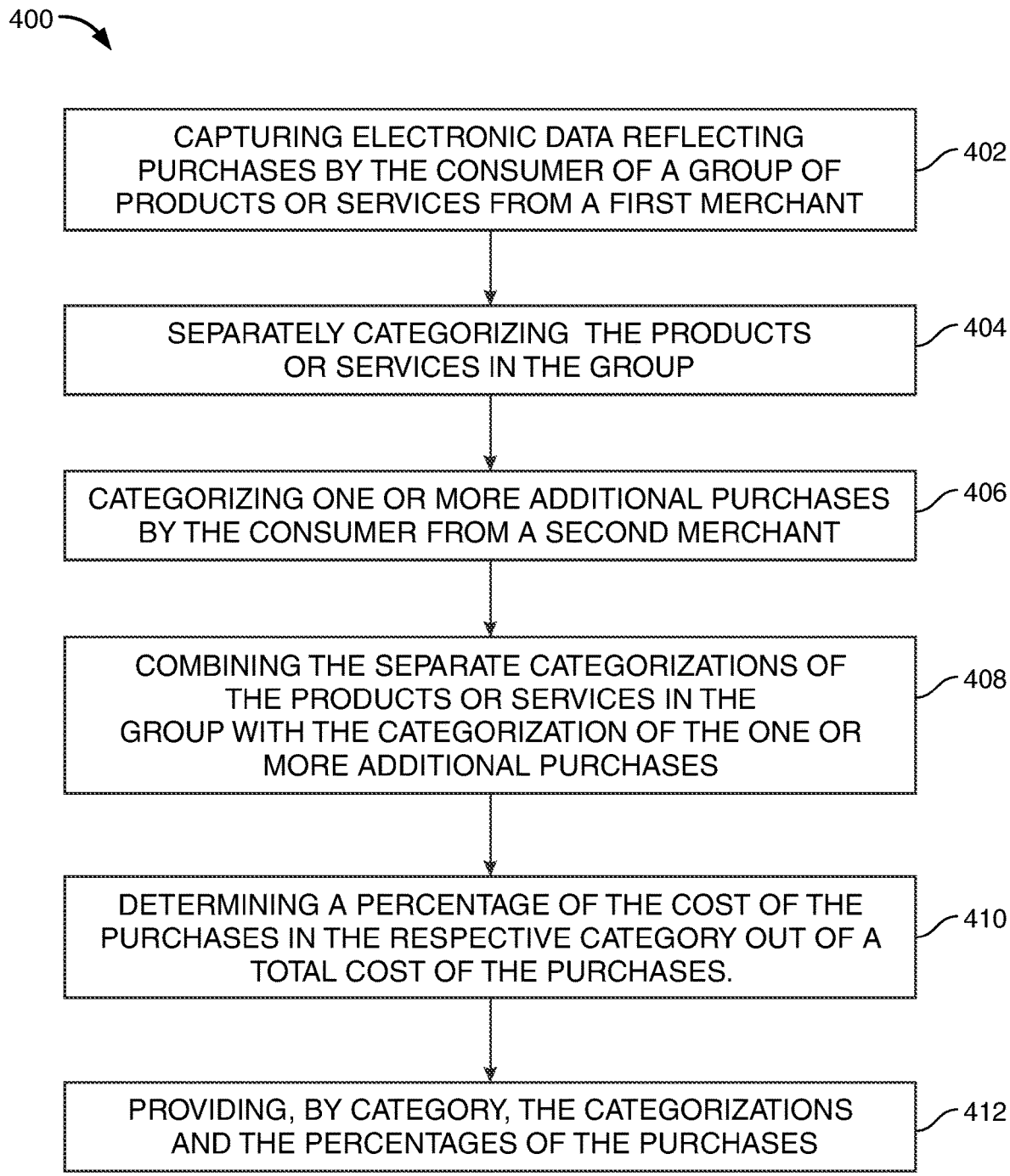
FIG. 4 shows an illustrative flow chart of method steps that may be performed by a bot in a first embodiment in accordance with principles of the invention.

FIG. 4 shows an illustrative flow chart of a method 400 showing illustrative steps that may be performed by bot 105 to automatically categorize purchases of products or services by a consumer in accordance with principles of the invention. Bot 105 may be activated upon a request by the consumer or by an authorized third party.

At step 402, bot 105 may capture electronic data that includes transaction information for purchases by the consumer of a group of products or services from a first merchant. Authorization from the consumer may be needed by entity 104 that operates bot 105 in order to obtain the transaction information. The transaction information for certain items may have category descriptions that are provided by the merchant. For one or more of the group of products or services that have been purchased from the first merchant, no category descriptions may be provided. However, the transaction information from the first merchant may include at least one of a category code, a product or service description, or a product or service identifier associated by the first merchant with a respective product or service that may be extracted and used to categorize the respective item. The transaction information may also include a cost of the respective product or service. The transaction information may include merchant information that may identify the merchant by the merchant name, a merchant code, or other merchant-related information that is specific to the first merchant. The first merchant may be, for example, an online marketplace which offers products or services from multiple sellers or a department store.

Examples of a consumer's transaction information that may be accessed by bot 105 to capture data for consumer purchases include: (1) billing statements for the consumer, such as billing statements from credit or debit card issuers; (2) transaction information for the consumer that may be obtained by bot by accessing an account of the consumer with the first merchant or the second merchant; (3) an inbox or database stored in a memory in which payment confirmations associated with at least one of the first and second merchants may be maintained; (4) a payment service such as a third party payment platform used by the consumer; and (5) electronic copies of receipts, such as, for example, electronic receipts that are emailed to a consumer or downloaded by the consumer from a merchant website. The receipts may also be derived from paper receipts that are scanned in and read with an optical character recognition (OCR) tool. Authorization to access any of this information may be provided by the consumer or the consumer may provide authorization to provide access to bot 105.

At step 404, the products or services may be separately categorized by bot 105. The products or services in the transaction are "debundled" from one another so that the products or services in the transaction may be categorized separately from one another. Products or services from the first merchant, and other merchants, that are not identified by a category description may be categorized based on the at least one of the category code, the product or service description, or the product or service identifier associated with the respective product or service that is provided. If there is no description, code, or other identifier for an item and no category description, then that item may only be able to be categorized as "Other." For items for which a category description is provided by the merchant, the provided category descriptions may be used by bot 105 to categorize the items if the categories are within available categories or new categories may be created. Otherwise, the provided category description may have to be changed by bot 105 to reflect categories that bot 105 may use.

At step 406, one or more additional purchases from a second merchant may be categorized by bot 105. In some embodiments, the second merchant may sell a second group of products or services that may be categorized in one of different categories, which may be performed similarly to the categorization of step 404. In other embodiments, the second merchant may only sell products or services in a single category so that the category may be identified by the merchant name, other merchant-related information, or a merchant code specific to the second merchant. The prices of the products or services are obtained from the billing statement or receipt.

At step 408, the categorizations of step 404 and 406 for purchases from the different merchants may be combined by bot 105. There may be overlap in the categories of purchases from the multiple merchants.

At step 410, bot 105 determines, for each category, a percentage of the cost of the purchases in the respective category out of a total cost of the purchases on a particular data or during a specified time range.

At step 412, bot 105 provides the combined categorizations and the percentages for each category for at least the first and second merchants.

Method 400 may be repeated by bot 105 periodically to update the categorizations and percentages.

In addition, bot 105 may also compile from the transaction information day or time information for the purchases that may be used to understand the days and times at which the consumer purchases the products and services. This information may be provided to the consumer or third party as well.

The categorization of products or services from the first and second merchants may also be combined by bot 105 with a similar separate categorization of products or services that the consumer purchases from additional merchants and a percentage of the costs of the purchases in the respective categories across the merchants out of a total cost of purchases may be determined.

Information regarding the categorization of purchases and percentages, by category, of the purchases may be provided to a consumer directly or to a third party and may be presented in different ways. For example, the information may be presented as a list of categories and percentages (e.g., a list may indicate "Food" 26%, "Clothing" 17%, etc.)

The information may also be presented, for example, graphically such as in the form of a pie chart 400 shown in FIG. 6A. The illustration may be provided, for example, in an email, on a monthly statement, or on a website where it may be accessed, to name a few. Where a pie chart is used, the consumer may specify category limits and, if the purchases in the category exceed a limit in one or more categories, the consumer may be alerted that the limits are exceeded, such as by highlighting this information in a color such as in pink or red.

Bot 105 or a third party may use the information to offer a promotion to the consumer in exchange for the consumer granting authorization to permit bot 105 to categorize the purchases at the merchants. The promotion to the consumer may be based on purchase activity of the consumer reflected in the combined categorizations and percentages for the first and second merchants. For example, bot 105 may cause a promotional offer for purchasing housewares to be sent to the consumer. The promotional offer may be, for example, for housewares at one of the first and second merchants or somewhere else. The promotional offer may be one of various types of promotions. It may be, for example, a discount, a coupon, a gift card, or a free item, to name a few.

The promotion may be based on buying patterns that are detected based on the purchase activity of the consumer. The buying patterns may include the combined categorizations and percentages and may include any day or time information of the purchases.

In a further aspect of the present disclosure, bot 105 may be programmed to categorize items that a consumer is considering purchasing, but are not yet purchased, in addition to products or services that were already purchased. This may enable a consumer to check, for example, whether the items being considered for purchase conform to a consumer spending plan that may limit purchases to a percentage of purchases in one or more categories.

A consumer may consider ordering additional items from an online marketplace 114 in addition to items already purchased. The consumer may select these additional items in an app 109 for the online marketplace on consumer device 106.

Figure 3B:
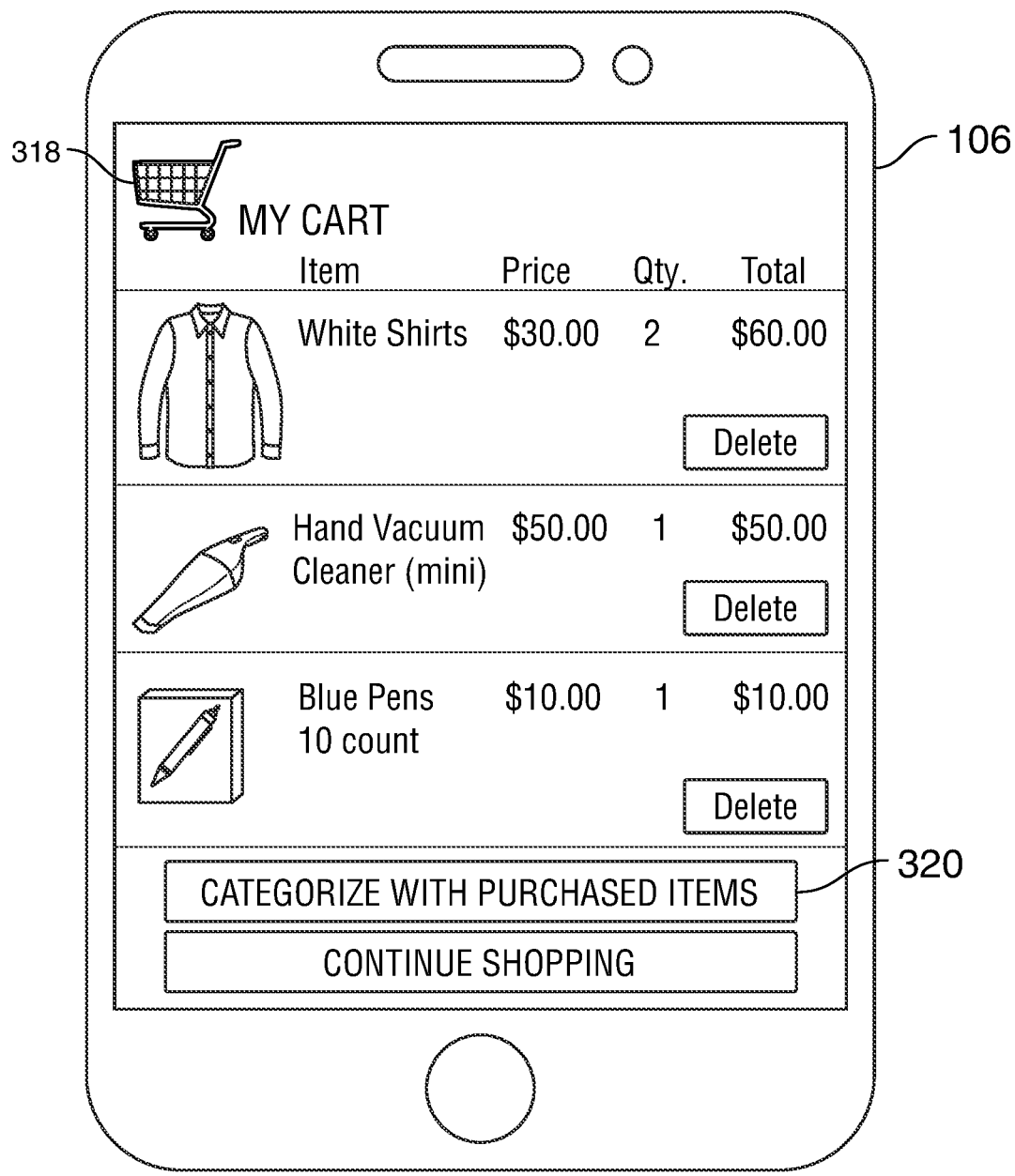
FIG. 3B shows an illustrative example of a list of items in a consumer's online shopping cart that may be categorized in combination with other transaction information in accordance with principles of the disclosure.

FIG. 3B provides an illustrative example where the selected additional items in an online shopping cart 318 may include, for example, white shirts, a hand vacuum cleaner, and a pack of blue pens, and may be saved in an online shopping cart. The consumer may wish to consider how these items in the shopping cart, if purchased, may impact an overall categorization and percentages, by category, of items already purchased. When desired, the consumer may activate a button 320 on a display of consumer device 106 to see revised categorization and percentages. The consumer may thereafter add another item or delete an existing item from the online shopping cart and may then again hit button 320 to determine how the categorization and percentages may change.

Figure 3C:
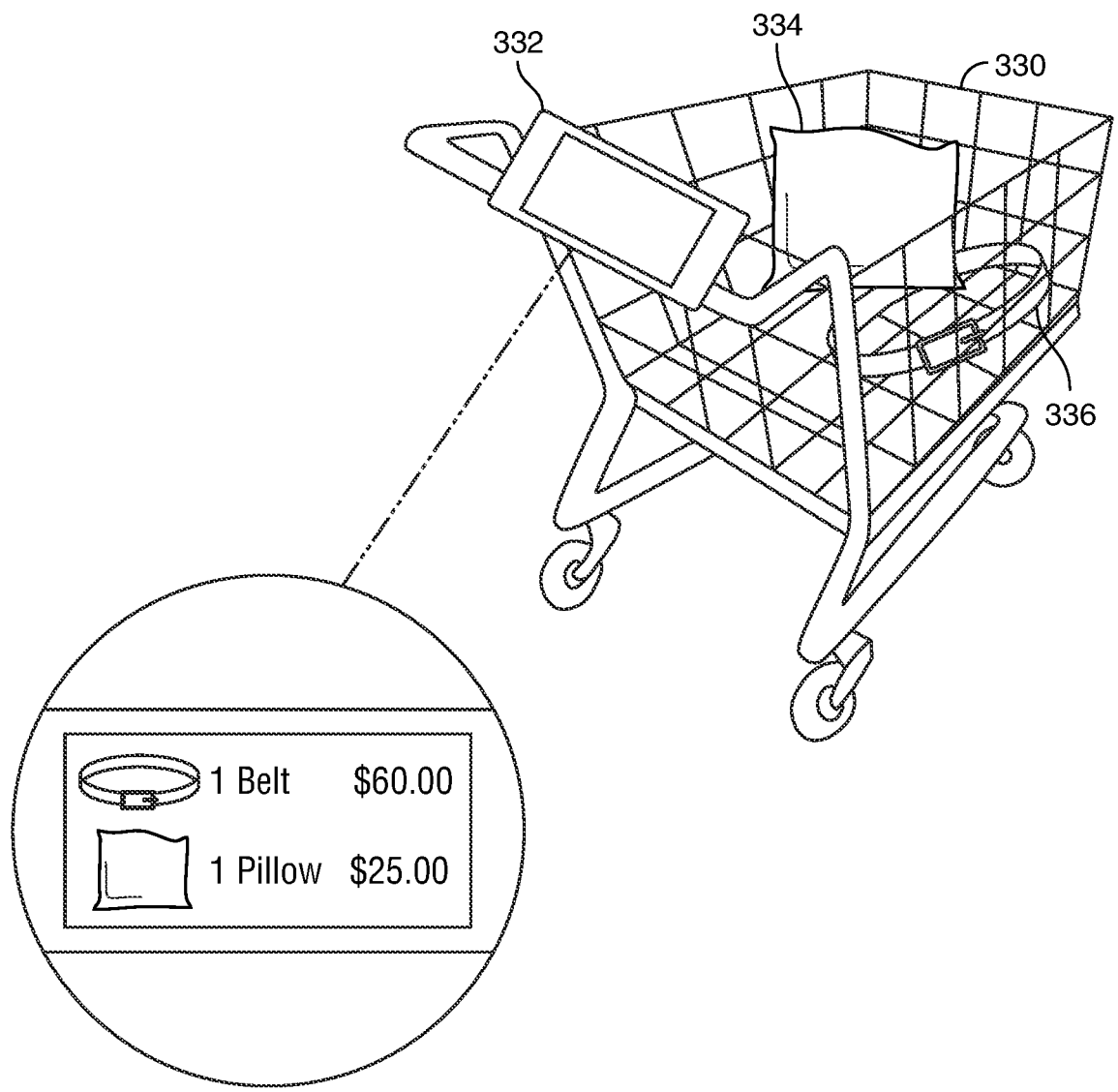
FIG. 3C shows a shopping cart containing items that have been scanned and may be categorized in combination with other transaction information in accordance with principles of the disclosure.
Figure 5:
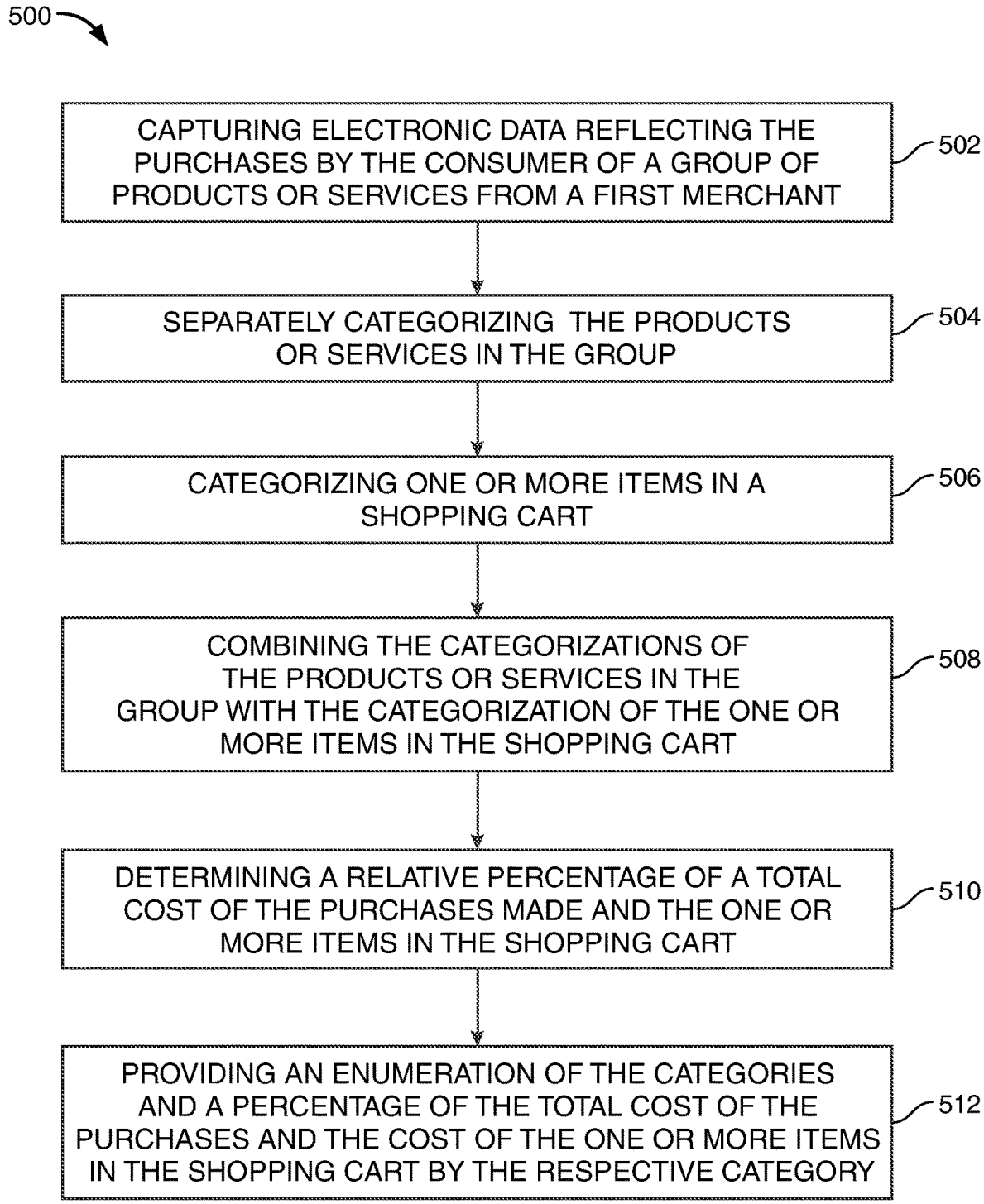
FIG. 5 shows an illustrative flow chart that show steps that may be performed by a bot in a second embodiment in accordance with principles of the invention.

FIG. 3C provides another illustrative example where a consumer shops in store and places items into a physical shopping cart 330. The consumer may scan codes on items placed into shopping cart 330 using a scanner 332 to identify and store the items placed into shopping cart 330 and costs thereof. Items may include, for example, a pillow 334 and a belt 336. The data generated by the scan may include an identification of each item scanned and the prices of the items. The scanned data may be shown, for example, on a display on scanner 332. In embodiments, the data may be transmitted from scanner 332 to consumer device 106 and may then be provided to bot 105. The consumer may activate a button on device 106 to revise categorization information accordingly. The consumer may then add another item or delete an existing item from the online shopping cart and may then again activate button 320 to determine how the categorization may change FIG. 5 shows an illustrative flow chart of a method 500 that may be performed by bot 105 in a second embodiment in accordance with principles of the invention. The potential purchases of the one or more items in a shopping cart may be categorized along with actual consumer purchases from one or more merchants.

Steps 502 and 504 of method 500 may be performed by bot 105 and may correspond to steps 402 and 404, respectively, described above with reference to FIG. 4. At step 502, bot 105 may capture electronic data that includes transaction information for purchases by the consumer of a group of products or services from a first merchant. At step 504, the products or services may be separately categorized by bot 105.

Following step 504, the consumer may shop and add items to a shopping cart. The shopping may be performed online, such as with consumer device 106, or in store. At step 506, the items in the shopping cart may be categorized by bot 105. The items in the shopping cart may be separately categorized. This categorization may be performed automatically by bot 105 in real-time, at a specified time, or upon request (e.g., by the consumer or a third-party). At step 508, bot 105 may combine the categorization of the products or services from the first merchant with the categorization of the items in the shopping cart. At step 510, bot 105 may calculate, for each category of a combination of purchases and items in the shopping cart, a relative percentage of a total cost of the purchases and items in the shopping cart. At step 512, bot 105 may provide to the consumer or to a third party, the categories into which the actual purchases from the first merchant and the items in the shopping cart have been categorized and percentage of total cost for each of the categories. Method 500 may be updated periodically and may be updated when items are added to or removed from the shopping cart.

Figure 6B:
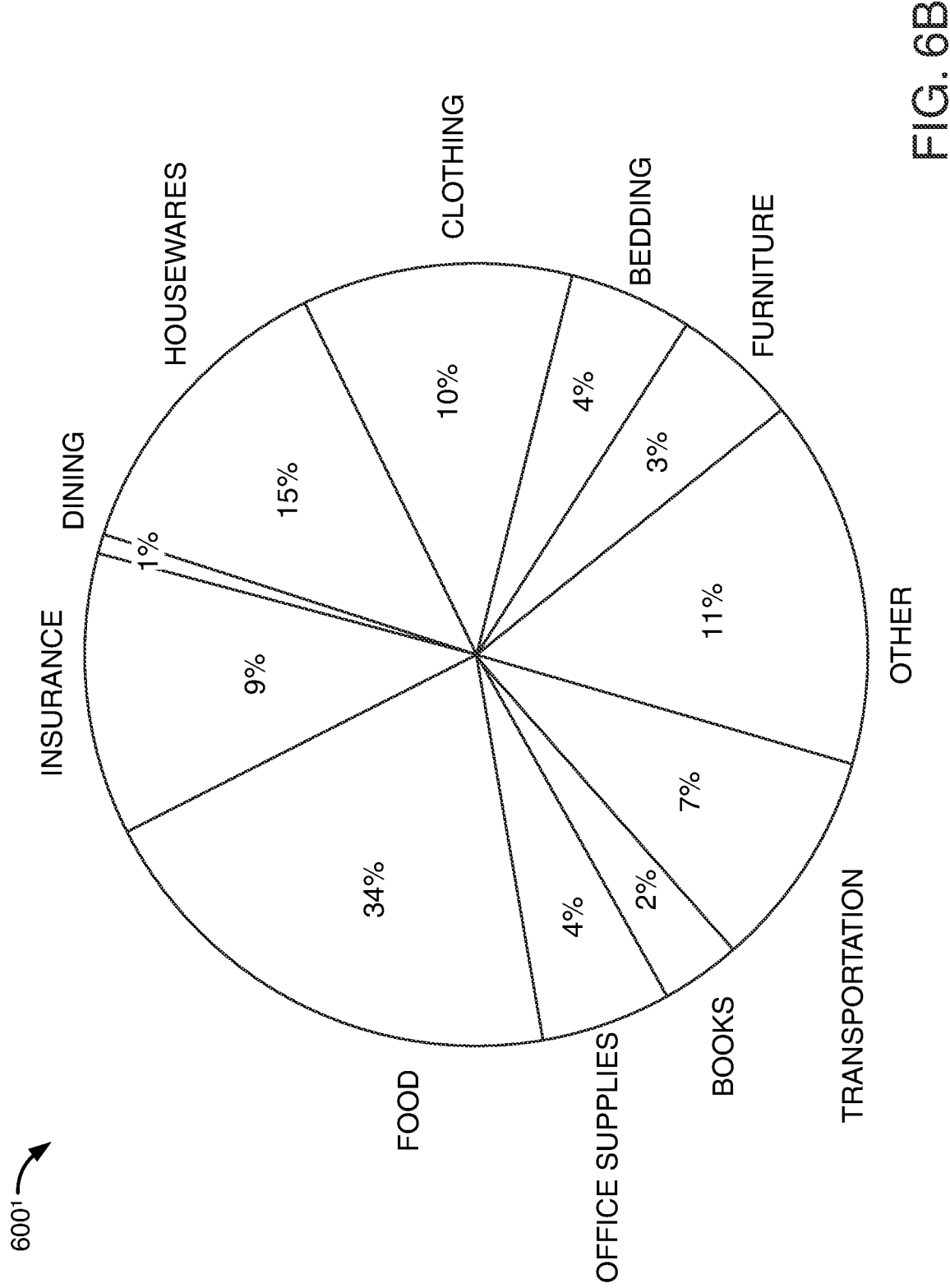
FIG. 6B shows another illustrative pie chart that displays different combined categorization information in accordance with principles of the disclosure.

The categorization information reflecting a categorization of actual purchases an online or physical shopping cart and percentages may be provided to a consumer or third party in different ways. For example, it may be provided in the form of a pie chart 600' as shown in FIG. 6B. In embodiments, the same information may be presented, for example, as a list of categories and percentages.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Figure 7:
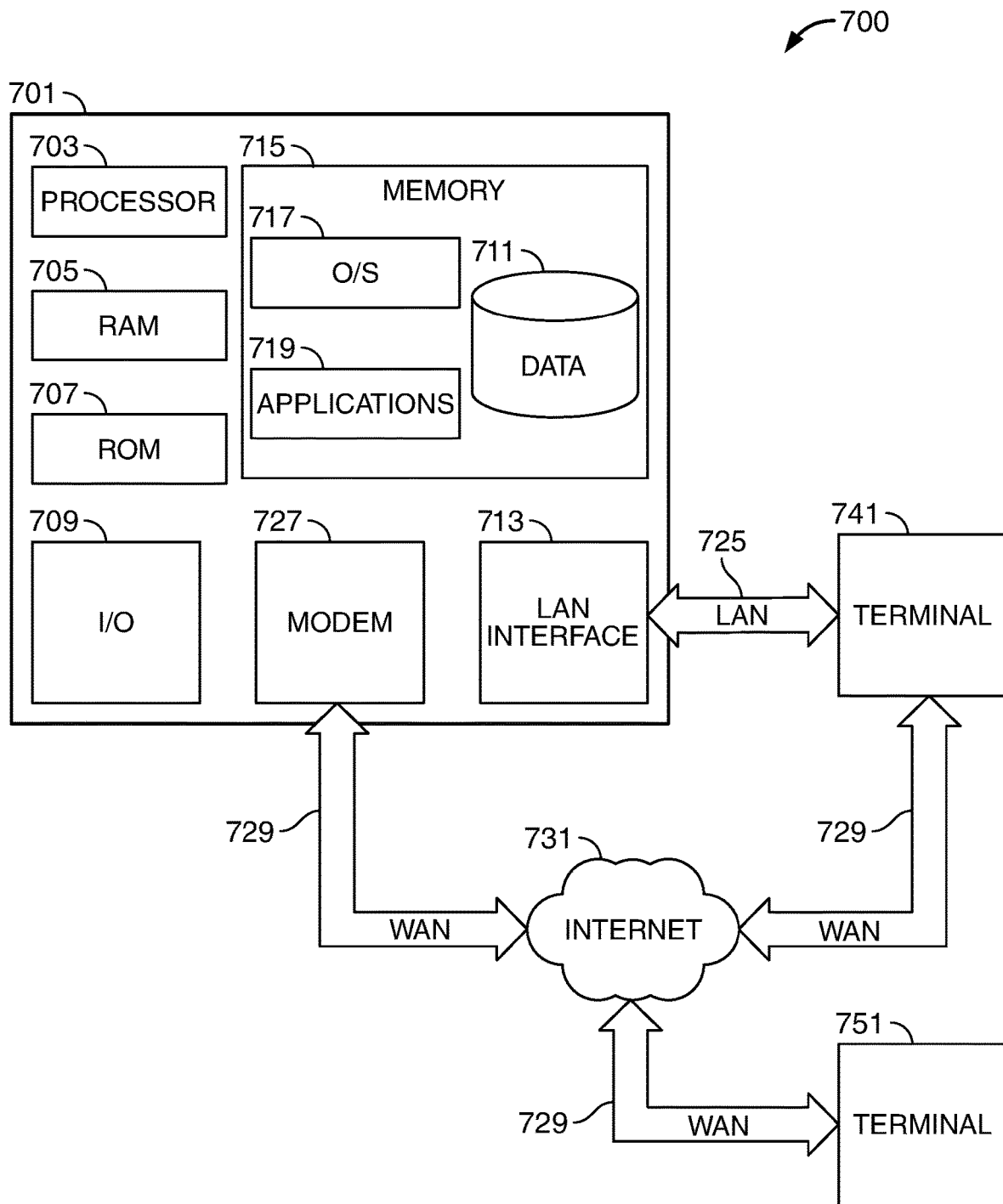
FIG. 7 shows an illustrative system architecture in accordance with principles of the disclosure.

FIG. 7 shows an illustrative block diagram of system 700 that includes computer 701. Computer 701 may alternatively be referred to herein as an "engine," "server" or a "computing device." Computer 701 may be any computing device described herein, such as the computing devices running on a computer at entity 104 or on the consumer device, smart phones, smart cars, smart cards and any other mobile device described herein. Elements of system 700, including computer 701, may be used to implement various aspects of the systems and methods disclosed herein.

Computer 701 may have a processor 703 for controlling the operation of the device and its associated components, and may include RAM 705, ROM 707, input/output circuit 709, and a non-transitory or non-volatile memory 715. Machine-readable memory may be configured to store information in machine-readable data structures. Other components commonly used for computers, such as EEPROM or Flash memory or any other suitable components, may also be part of the computer 701.

The memory 715 may be comprised of any suitable permanent storage technology—e.g., a hard drive. The memory 715 may store software including the operating system 717 and application(s) 719 along with any data 711 needed for the operation of computer 701. Memory 715 may also store videos, text, and/or audio assistance files. The data stored in Memory 715 may also be stored in cache memory, or any other suitable memory.

Input/output ("I/O") module 709 may include connectivity to a microphone, keyboard, touch screen, mouse, and/or stylus through which input may be provided into computer 701. The input may include input relating to cursor movement. The input/output module may also include one or more speakers for providing audio output and a video display device for providing textual, audio, audiovisual, and/or graphical output. The input and output may be related to computer application functionality.

Computer 701 may be connected to other systems via a local area network (LAN) interface 713. Computer 701 may operate in a networked environment supporting connections to one or more remote computers, such as terminals 741 and 751. Terminals 741 and 751 may be personal computers or servers that include many or all of the elements described above relative to computer 701.

In some embodiments, computer 701 may be the consumer device 106 and Terminals 741 and 751 may be the data center 102, and/or any of mobile devices that may be in electronic communication with consumer device 106 via LAN, WAN or any other suitable short-range communication when a network connection may not be established.

When used in a LAN networking environment, computer 701 is connected to LAN 725 through a LAN interface 713 or an adapter. When used in a WAN networking environment, computer 701 may include a modem 727 or other means for establishing communications over WAN 729, such as Internet 731.

In some embodiments, computer 701 may be connected to one or more other systems via a short-range communication network (not shown). In these embodiments, computer 701 may communicate with one or more other terminals 741 and 751, such as the mobile devices described herein etc., using a personal area network (PAN) such as Bluetooth®, NFC, ZigBee, or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 719, which may be used by computer 701, may include computer executable instructions for invoking functionality related to communication, such as e-mail, Short Message Service (SMS), and voice input and speech recognition applications. Application program(s) 719 (which may be alternatively referred to herein as "plugins," "applications," or "apps") may include computer executable instructions for invoking functionality related to performing various tasks. Application programs 719 may utilize one or more algorithms that process received executable instructions, perform power management routines or other suitable tasks.

Application program(s) 719 may include computer executable instructions (alternatively referred to as "programs"). The computer executable instructions may be embodied in hardware or firmware (not shown). The computer 701 may execute the instructions embodied by the application program(s) 719 to perform various functions.

Application program(s) 719 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 719 may include one or more algorithms that may be used to implement features of the disclosure.

The invention may be described in the context of computer-executable instructions, such as applications 719, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 701 and/or terminals 741 and 751 may also include various other components, such as a battery, speaker, and/or antennas (not shown). Components of computer system 701 may be linked by a system bus, wirelessly or by other suitable interconnections. Components of computer system 701 may be present on one or more circuit boards. In some embodiments, the components may be integrated into a single chip. The chip may be silicon-based.

Terminal 751 and/or terminal 741 may be portable devices such as a laptop, cell phone, Blackberry™, tablet, smartphone, or any other computing system for receiving, storing, transmitting and/or displaying relevant information. Terminal 751 and/or terminal 741 may be one or more user devices. Terminals 751 and 741 may be identical to computer 701 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, and/or smartphones, multiprocessor systems, microprocessor-based systems, cloud-based systems, programmable consumer electronics, network PCs, minicomputers, mainframe computers, distributed computing environments that include any of the above systems or devices, and the like.

Figure 8:
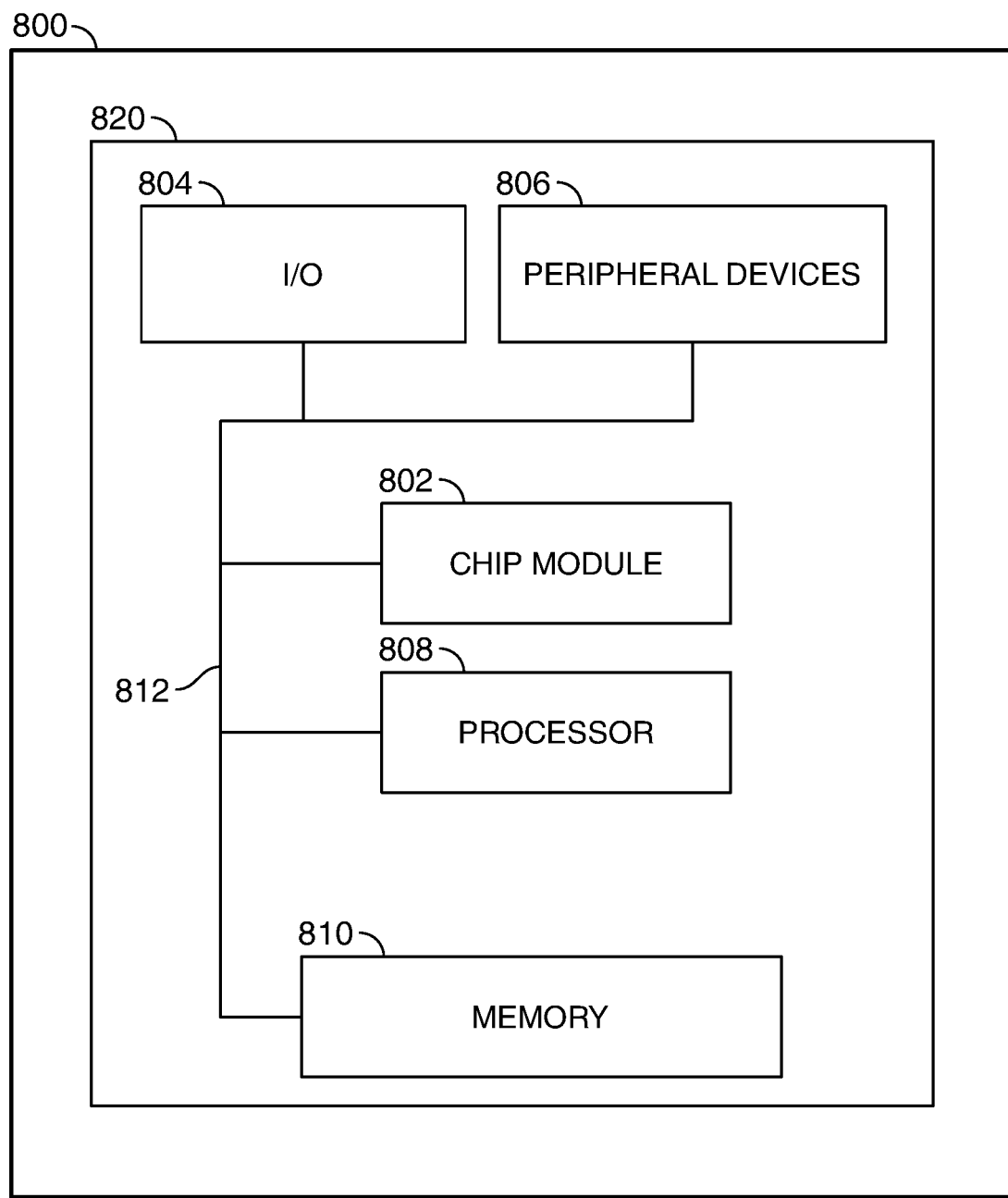
FIG. 8 shows an illustrative apparatus of a device in accordance with principles of the disclosure.

FIG. 8 shows illustrative apparatus 800 that may be configured in accordance with the principles of the disclosure. Apparatus 800 may be a computing device. Apparatus 800 may include chip module 802, which may include one or more integrated circuits, and which may include logic configured to perform any other suitable logical operations.

Apparatus 800 may include one or more of the following components: I/O circuitry 804, which may include a transmitter device and a receiver device and may interface with fiber optic cable, coaxial cable, telephone lines, wireless devices, PHY layer hardware, a keypad/display control device or any other suitable media or devices; peripheral devices 806, which may include counter timers, real-time timers, power-on reset generators or any other suitable peripheral devices; logical processing device 808, which may compute data structural information and structural parameters of the data; and machine-readable memory 810.

Machine-readable memory 810 may be configured to store in machine-readable data structures: machine executable instructions, (which may be alternatively referred to herein as "computer instructions" or "computer code"), applications such as applications 819, signals, and/or any other suitable information or data structures.

Components 802, 804, 806, 808 and 810 may be coupled together by a system bus or other interconnections 812 and may be present on one or more circuit boards such as circuit board 820. In some embodiments, the components may be integrated into a single chip. The chip may be silicon-based.

Thus, methods, systems, and apparatus may provide a consumer or a third party with enhanced categorization that includes a more detailed spending analysis for the consumer. Persons skilled in the art will appreciate that the present invention can be practiced by other than the described embodiments, which are presented for purposes of illustration rather than of limitation.

What is claimed is:

1. A computerized categorization system that automatically categorizes in an electronic format purchases by a consumer and one or more first items added to an online shopping cart and one or more second items that have been scanned and added to a physical shopping cart of a consumer, the system comprising:
   a scanner configured to i) scan codes on the one or more second items that are added to the physical shopping cart, ii) generate data based on the scanned codes including an identification of each of the one or more second items and prices of the one or more second items, and iii) transmit the generated data to an electronic device of the consumer;
   one or more processors configured to:

capture, by a bot, first electronic data comprising transaction information for purchases by the consumer of a group of products or services from a first merchant, wherein:
  the transaction information includes, for one or more of the products or services that were purchased from the first merchant:
    at least one of a category code, a product or service description, or a product or service identifier associated by the first merchant with the respective product or service; and
    a cost of the respective product or service,
    wherein the transaction information does not include a natural language product or service category description for the respective product or service that corresponds to one of a plurality of different natural language product or service category descriptions that have been predefined;
separately categorize, by the bot using the transaction information, the products or services in the group that were purchased from the first merchant according to one of the plurality of different natural language product or service category descriptions, wherein the categorization of the one or more of the products or services that were purchased from the first merchant is based on the at least one of the category code, the product or service description, or the product or service identifier associated with the respective product or service;
receive the generated data including the identification of each of the one or more second items and the prices of the one or more second items from the electronic device of the consumer;
separately categorize, by the bot, the one or more first items in the online shopping cart and the one or more second items in the physical shopping cart according to one of the plurality of different natural language product or service category descriptions and the received generated data, wherein the one or more first items or the one or more second items comprises one or more additional products or services sold by the first merchant or by a second merchant;
combine, by the bot in real-time, the categorizations of the products or services in the group that were purchased from the first merchant with the categorization of the one or more first items in the online shopping cart and the one or more second items in the physical shopping cart as the one or more first items are added to the online shopping cart and as the one or more second items in the physical shopping cart are scanned and added to the physical shopping cart;
determine, by the bot, for each of the different categories into which the products or services and the one or more first items in the online shopping cart and the one or more second items in the physical shopping cart are grouped, a relative percentage of a total cost of the purchases made by the consumer on a specific date or within a date range and the one or more first items and the one or more second items that are categorized in the respective category;
generate and transmit, by the bot to the electronic device of the consumer, a graphic comprising:
  the categories into which the purchases made by the consumer and the one or more first items and the one or more second items have been categorized; and
  for each of the categories, a percentage of the total cost of the purchases, the one or more first items and the one or more second items in the respective category;
when the consumer designates to the computer categorization system category limits on the cost of purchases in the respective category and the category limits will be exceeded if one or more of the one or more first items or the one or more second items are purchased, provide an alert to the electronic device of the consumer that highlights to the consumer in real-time on the graphic which of the one or more of the designated category limits will be exceeded if the one or more of the one or more first items and the one or more second items are purchased;
request, by the bot, authorization from the consumer to obtain the first electronic data comprising the transaction information directly from the first merchant;
detect, by the bot, buying patterns based on purchase activity of the consumer; and
offer, by the bot, a promotion to the consumer in exchange for the consumer granting the requested authorization, wherein the promotion is based on purchase activity of the consumer reflected in the detected buying patterns.

2. The system of claim 1, wherein the one or more processors are further configured to:
perform the categorization of a respective product, service, or item in the online shopping cart or the physical shopping cart by;
categorizing, by the bot, the respective product, service, or item based on the description of the respective product, service, or item; and
comparing, by the bot, the description to a predefined list of categories, wherein each respective category of the predefined list of categories is associated with a list of terms or abbreviations that are used in connection with the respective category.

3. The system of claim 1, wherein the one or more processors are further configured to:
combine, by the bot, the combined categorizations with additional purchase data reflecting one or more additional purchases by the consumer from a third merchant that sells products or services in only a single category;
categorize, by the bot, the one or more additional purchases made by the consumer based on the identity of the third merchant or a merchant category associated with the third merchant; and
combine, by the bot, the categorization of the one or more additional purchases with the categorization of the purchases from the first merchant.

4. The system of claim 1, wherein the one or more processors are further configured to:
recalculate, by the bot, the relative percentages of the purchases and the one or more first items in the online shopping cart and the one or more second items in the physical shopping cart, by category, out of the total cost of the purchases made by the consumer and the one or more first items in the online shopping cart and the one or more second items in the physical shopping cart on a specific date or within a date range when an additional item is added to the online shopping cart or to the physical shopping cart or when at least one of the one or more first items is removed from the online shopping cart or one or more of the second items is removed from the physical shopping cart.

\* \* \* \* \*